United States Patent
Han et al.

[11] Patent Number: 6,147,314
[45] Date of Patent: Nov. 14, 2000

[54] BUTTON PIVOT BAR

[75] Inventors: Amy Han, Mountain View; Ricardo Penate, Pacifica; Traci Angela Neist, Palo Alto; Robert Gregory Twiss, Portola Valley, all of Calif.

[73] Assignee: Palm, Inc., Santa Clara, Calif.

[21] Appl. No.: 09/201,650

[22] Filed: Nov. 30, 1998

[51] Int. Cl.[7] .................................................. H01H 13/70
[52] U.S. Cl. ........................................ 200/5 A; 200/343
[58] Field of Search .................................. 200/341, 343, 200/344, 5 A, 512–517, 5 R; 400/472–496, 490; 84/430

[56] References Cited

U.S. PATENT DOCUMENTS

| | | |
|---|---|---|
| D. 276,334 | 11/1984 | Dickerson . |
| D. 338,191 | 8/1993 | Ahmed et al. . |
| D. 369,143 | 4/1996 | Sorenson . |
| 1,148,721 | 8/1915 | Scott . |
| 3,612,802 | 10/1971 | Beadle et al. . |
| 4,132,877 | 1/1979 | Daigle ..................................... 200/296 |
| 4,315,114 | 2/1982 | Monti, Jr. ................................ 200/5 A |
| 4,323,740 | 4/1982 | Balash . |
| 4,389,549 | 6/1983 | Brown . |
| 5,219,067 | 6/1993 | Lima et al. . |
| 5,293,018 | 3/1994 | Lander . |
| 5,357,071 | 10/1994 | Hanaki . |
| 5,426,275 | 6/1995 | Maeda et al. . |
| 5,560,475 | 10/1996 | Brundage et al. . |
| 5,629,832 | 5/1997 | Sellers . |
| 5,629,837 | 5/1997 | Barabi et al. . |
| 5,710,398 | 1/1998 | Hassler et al. . |
| 5,718,326 | 2/1998 | Larose et al. . |
| 5,749,457 | 5/1998 | Casteneda et al. ..................... 200/343 |
| 5,927,483 | 7/1999 | Yamada ................................... 200/343 |

*Primary Examiner*—Michael L. Gellner
*Assistant Examiner*—Nhung Nguyen
*Attorney, Agent, or Firm*—Van Mahamedi; Wilson Sonsini Goodrich & Rosati

[57] ABSTRACT

Systems and methods are described for an integral button pivot bar. A palm sized computer that can be held in one hand and operated with a stylus held by another hand, includes: a connecting trunk; a first connecting member coupled to the connecting trunk; an independently actuatable button coupled to the first connecting member; a second connecting member coupled to the connecting trunk; a torsion bar connected to the second connecting member; and an independently actuatable rocking switch coupled to the second connecting member. The connecting trunk, the first connecting member, the independently actuatable button, the second connecting member, the torsion bar, and the independently actuatable rocking switch are all integrally formed and actuating the independently actuatable rocking switch does not affect the independently actuatable button. The systems and methods provide advantages because a user does not need to divert their attention from the tip of the stylus, or reconfigure their hand, when the actuation of one, or more, of the buttons is necessary.

49 Claims, 8 Drawing Sheets

BUTTON PIVOT BAR

BACKGROUND OF THE INVENTION

1. Field of the Invention

The invention relates generally to the field of plan sized computers. More particularly, the invention relates to stylus tappable palm sized computer buttons.

2. Discussion of the Related Art

Palm sized computers, sometimes called personal data assistants, typically include a plurality of manually actuatable buttons and a display screen. The buttons can be convex in shape so as to protrude from the surface in which they are mounted, thereby enhancing their functional accessibility. The display screen can be a touch sensitive screen so as to function as a user input device. A stylus can be used in conjunction with such a touch screen so as to permit the touch screen to be segmented into fields that are too small to be individually actuated by the average human finger.

A problem with this technology has been that a user who is using the stylus to input data to the touch screen must shift their attention away from the tip of the stylus when it is necessary to actuate one of the buttons because the convex surfaces are not functionally compatible with the tip of the stylus. At best, the user must rotate their hand inward so that one, or more, unoccupied finger tips (e.g., ring and/or small finger) can be used to actuate the button. Alternatively, the user can reconfigure their hand so as to continue to hold the stylus and free a finger tip that was previously occupied in holding the stylus. In a worst case, the user must take the time to put the stylus down and then actuate the button. In this later case, after the button has been actuated, the user must also take the time to pick up the stylus. Therefore, what is required is solution that permits a user to actuate one of the manually actuatable buttons in a more time efficient manner.

Another problem with this technology has been that providing a palm sized computer with a manually actuatable button is relatively costly. The button must be mounted on the palm sized computer, operably coupled to a switch, and provided with a resilient structure to restore the button its original position after it is actuated. This becomes more problematic when a plurality of manually actuatable buttons must be provided, especially where the buttons are to be distributed across a surface of the palm sized computer or where there are different types of button mechanisms. Therefore, what is also required is a solution that permits a plurality of manually actuatable buttons to be provided on a palm sized computer in a more cost effective manner.

Heretofore, the requirements of time efficiency and cost effectiveness referred to above have not been fully met. What is needed is a solution that simultaneously addresses both of these requirements.

SUMMARY OF THE INVENTION

A primary goal of the invention is to provide a palm sized computer with a plurality of independently actuatable single stroke buttons (e.g., applications buttons) that are integrally formed from a single member, where actuating one of the single stroke buttons does not substantially affect any of the other buttons. Another primary goal of the invention is to provide a palm sized computer with a rocker switch (e.g., navigation buttons) and one, or more, single stroke buttons that are integrally formed from a single member, where actuating the rocker switch does not substantially affect any of the single stroke buttons. Another primary goal of the invention is to provide a palm sized computer with a rocker switch having an integrally formed fulcrum that defines a plane that is located beneath a plane defined by the center of gravity of the rocker switch. Another primary goal of the invention is to provide a method of operating a palm sized computer that includes actuation of an application button with a stylus that can also be used to actuate another user input device. Another primary goal of the invention is to provide a method of operating a palm sized computer that includes actuation of a navigation button with a stylus that can also used to actuate another user input device.

In accordance with these goals, there is a particular need for a button pivot bar to be incorporated in a palm sized computers. The button pivot bar can include one, or more, connecting trunks and one, or more, connecting branches. The connecting trunks and branches will be discussed below in more detail. The button pivot bar can be a single member that is integrally formed. Thus, it is rendered possible to simultaneously satisfy the above-discussed requirements of time efficiency and cost effectiveness, which, in the case of the prior art, cannot be simultaneously satisfied.

A first aspect of the invention is implemented in an embodiment that is based on a palm sized computer that can be held in one hand and operated with a stylus held by another hand, comprising: a connecting trunk; a first connecting member coupled to said connecting trunk; a first independently actuatable button coupled to said first connecting member; a second connecting member coupled to said connecting trunk; and a second independently actuatable button coupled to said second connecting member, wherein said connecting trunk, said first connecting member, said first independently actuatable button, said second connecting member, and said second independently actuatable button are all integrally formed. A second aspect of the invention is implemented in an embodiment that is based on a palm sized computer that can be held in one hand and operated with a stylus held by another hand, comprising: a connecting trunk; a first connecting member coupled to said connecting trunk; an independently actuatable button coupled to said first connecting member, a second connecting member coupled to said connecting trunk; a torsion bar connected to said second connecting member; and an independently actuatable rocking switch coupled to said second connecting member, wherein said connecting trunk, said first connecting member, said independently actuatable button, said second connecting member, said torsion bar, and said independently actuatable rocking switch are all integrally formed and actuating said independently actuatable rocking switch does not affect said independently actuatable button. A third aspect of the invention is implemented in an embodiment that is based on a palm sized computer that can be held in one hand and operated with a stylus held by another hand, comprising: an independently actuatable rocking switch having an integrally formed fulcrum that defines a first plane that is located beneath a second plane that is defined by the center of gravity of said independently actuatable rocking switch. A fourth aspect of the invention is implemented in an embodiment that is based on a method of operating a palm sized computer with a stylus, comprising: actuating a stylus tappable application button with said stylus. A fifth aspect of the invention is implemented in an embodiment that is based on a method of operating a palm sized computer with a stylus, said method comprising: actuating a stylus tappable navigation button with said stylus.

These, and other, goals and aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters designate the same parts. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The context of the invention includes personal computing, especially portable palm sized computers, such as personal data assistants. The invention can be utilized in conjunction with palm sized computers that include communication links, such as, cables (e.g., serial or parallel) or wireless transceivers (e.g., infrared or radio frequency). The invention can also utilize data processing methods that transform the user input signals so as to actuate interconnected discrete hardware elements; for example, to launch a software application.

The concept of the invention includes providing a palm sized computer with a plurality of buttons that composes a unitary structure. Thus, the plurality of buttons are provided by a single part that can be integrally formed. This single part can be attached to the palm sized computer by friction fitting alignment posts into alignment holes that are formed in the part. The alignment posts can be provided on a circuit board, on a structural component (e.g., a midframe), or on any other part of the palm sized computer.

The concept of the invention includes a button pivot bar that is composed of one, or more, connecting branches coupled to one, or more connecting trunks. Each of the plurality of buttons can be coupled to one of the connecting branches. Each of the connecting branches can, in-turn, be coupled to one, or more connecting trunks. The terms branch(es) and trunk(s), as used herein, define structural members that hold the buttons in operational position. Generally, the buttons are connected to the branches, rather than to the truk(s), so that the trunk(s) function to isolate the movement of a given button from affecting the position of any other button.

The plurality of buttons can include a subplurality of single stroke application buttons and/or a subplurality of navigational buttons. One, or more, of the plurality of buttons can be actuated with a stylus that is used by the operator to actuate other user input devices, such as, for example, a touch sensitive screen.

The buttons can be adjacent contact switches that are surface mounted on a circuit board. These switches can be termed micro switches, and can be flexible membrane switches, fluid filled switches, etcetera. Alternatively, the buttons can be in functional engagement with any type of switch that is operationally coupled to the palm sized computer. The term coupled, as used herein, is defined as connected, although not necessarily directly, and not necessarily mechanically.

The concept of the invention also includes combining a plurality of independently actuatable single stroke buttons in a single member that is integrally formed. Each of the independently actuatable single stroke buttons can be joined to one side of a connecting trunk with a corresponding plurality of connecting members. In this way, all of the independently actuatable single stroke buttons can extend from one side of the connecting trunk. Thus, actuating one of the buttons will not substantially affect the spatial position of any of the other buttons because the connecting branch that is coupled to the actuated button reduces the arc of movement as a lever. Further, substantially all of the residual displacement that occurs at the end of the connecting member that is coupled to the connecting trunk is sunk into torsional flexure of the connecting trunk. Therefore, any adjacent connecting members and the corresponding buttons are not affected by actuation of any prime mover button. A prime mover button is that button that is initially deflected by the user of the palm-sized computer device.

The concept of the invention also includes combining a rocker switch with one or more single stroke buttons. The rocker switch and the buttons can be integrally formed from a single member. By connecting the rocker switch to the connecting trunk with a connecting member that is similar to the ones used to couple the single stroke buttons to the connecting trunk, actuating the rocker switch does not affect any of the single stroke buttons.

The concept of the invention also includes a rocker switch having an integrally formed fulcrum that defines a first plane that is located beneath a second plane defined by the center of gravity of the rocker switch. Where the fulcrum defines a line, the orientation of the first plane will be constrained by the orientation of the line. Further, the first and second planes can be parallel. The fulcrum is not necessarily located directly beneath the center of gravity, although it may be.

The fulcrum can take the form of very small surface area that can slide along a bearing surface. In this case, the fulcrum can move laterally and/or longitudinally when the rocker switch is actuated. By extending the plane defined by fulcrum away from the plane defined by the center of gravity of the rocker switch, the rocker switch can be given a degree of freedom that includes angular displacement through an arc. The center of the arc is defined by the location of the fulcrum. The degree of available displacement corresponds trigonometrically to angular displacement and the length of the distance that the plane defined by the fulcrum is displaced from the plane defined by the center of gravity of the rocker switch. Thus, the rocker switch can provide improved tactile feedback to the user. Specifically, the user can sense displacement of the rocker switch through a relatively large distance, even when the orthographic downward displacement parallel to normal between the plane defined by the fulcrum and the plane defined by the center of gravity of the rocker switch is relatively small.

However, increasing the length of the distance that the plane defined by the fulcrum is displaced from the plane defined by the center of gravity of the rocker switch increases the overall size of the rocker switch and fulcrum, and consequently the pivot bar. Therefore, for the sake of compactness, this distance that the plane defined by the fulcrum is displaced from the plane defined by the center of gravity of the rocker switch may be moderated (made shorter) to bring the fulcrum closer to the rest of the rocker switch, or reduced as much as possible to bring the fulcrum as close to the rest of the rocker switch structure as the other internal component geometries will allow. In more detail, this distance may need to assume at least a minimum dimension so as to provide clearance between the rocker switch and the other internal components (e.g., flexible membrane switches, etc.). The invention includes optimizing this distance to simultaneously provide clearance, compactness, and improved tactile feedback.

Figure 1:
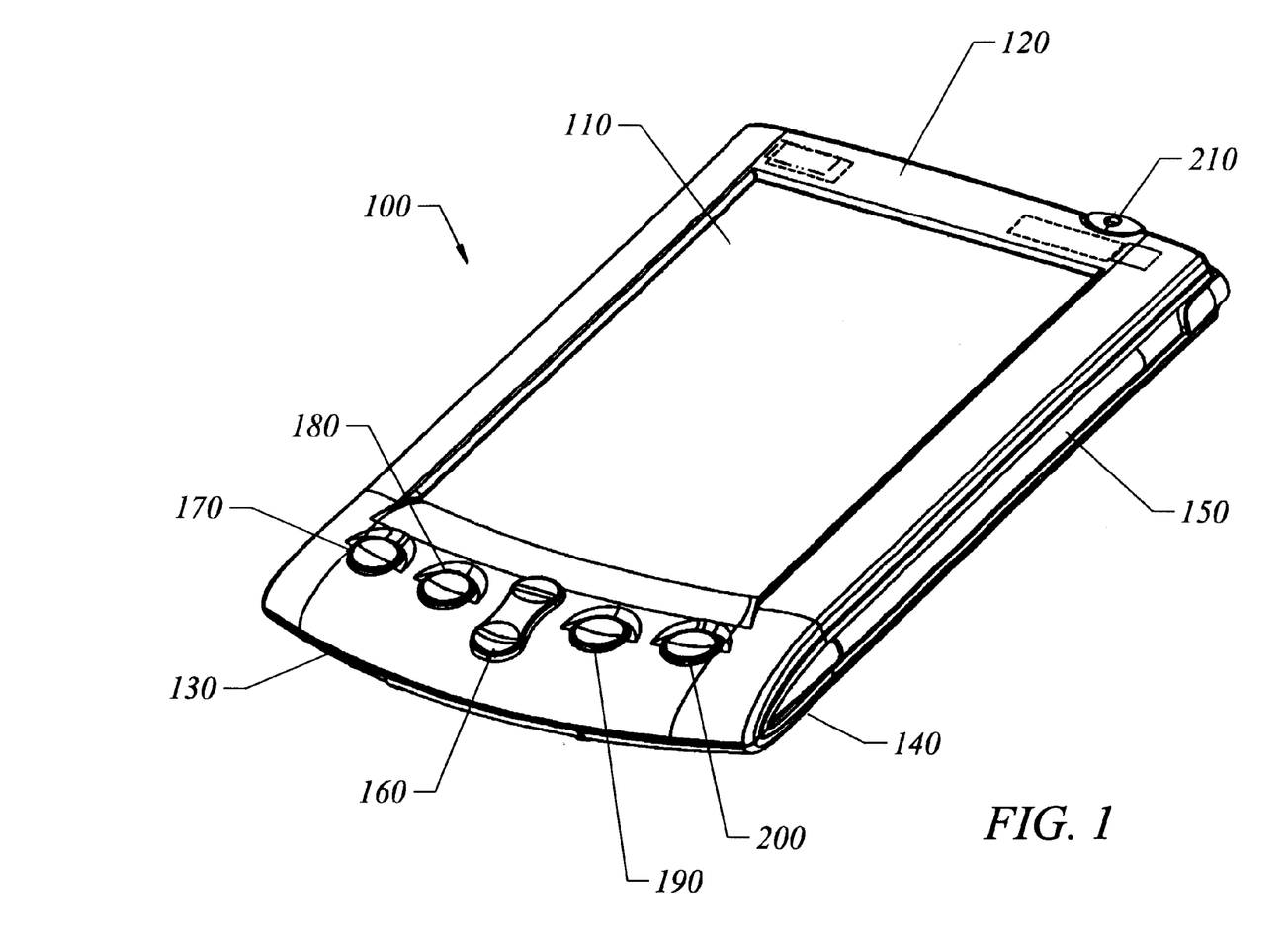
FIG. 1 illustrates a forward top perspective view of a palm-sized computer, representing an embodiment of the invention.

Referring to FIG. 1, the palm-sized computer 100 includes a touch sensitive screen 110. The palm-sized computer 100 includes a top panel 120, a mid frame 130, and a bottom panel 140. The palm-sized computer 100 includes a stylus 150 that can be stowed alongside the midframe 130 between the top panel 120 and the bottom panel 140.

Still referring to FIG. 1, the palm-sized computer includes a rocker switch 160. The palm-sized computer 100 includes a first applications button 170. The palm-sized computer 100 includes a second applications button 180. The palm-sized computer 100 includes a third applications button 190. The palm-sized computer 100 includes a fourth applications button 200. As used herein, the terms "first", "second", "third", "fourth", etc. are fully interchangeable and recited merely for the purpose of distinguishing separate structures. The applications buttons 170, 180, 190 and 200, can be single-stroke buttons. The palm-sized computer 100 includes a power switch 210.

The particular manufacturing process used for making the unitary structure should be inexpensive and reproducible. For the manufacturing operation, it is an advantage to employ an injection molding technique.

However, the particular manufacturing process used for forming the integral part is not essential to the invention as long as it provides the described functionality. Normally those who make or use the invention will select the manufacturing process based upon tooling and energy requirements, the expected application requirements of the final product, and the demands of the overall manufacturing process.

The particular material used for the integral part should have a low enough modulus of rigidity that the buttons can be readily deflected by the user (with a fingertip or a stylus) but also be resilient. Conveniently, the integral part can be made of any plastic material. It is preferred that the material be a thermoplastic material. For the manufacturing operation, it is an advantage to employ a polycarbonate material, such as, for example, GE LEXAN 121–21092.

However, the particular material selected for integral part is not essential to the invention, as long as it provides the described function. Normally, those who make or use the invention will select the best commercially available material based upon the economics of cost and availability, the expected application requirements of the final product, and the demands of the overall manufacturing process.

EXAMPLE

A specific embodiment of the invention will now be further described by the following, nonlimiting example which will serve to illustrate in some detail various features of significance. The example is intended merely to facilitate an understanding of ways in which the invention may be practiced and to further enable those with skill in the art to practice the invention. Accordingly, the examples should not be construed as limiting the scope of the invention.

Figure 2:
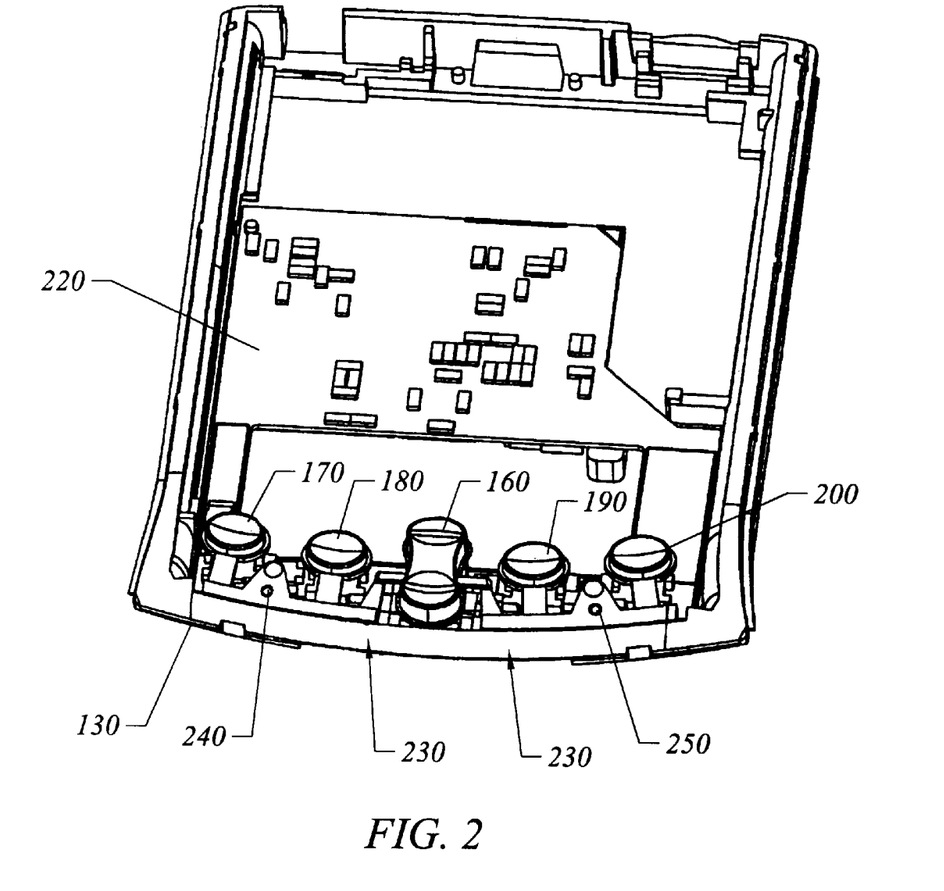
FIG. 2 illustrates a forward top perspective view of a partially disassembled palm-sized computer representing an embodiment of the invention.

Referring now to FIG. 2, the inside of the midframe 130 can be seen. The midframe 130 is coupled to a circuit board 220. The rocker switch 160 and the applications buttons 170, 180, 190, and 200, compose a button pivot bar 230. The button pivot bar 230 includes a first alignment hole 240 and a second alignment hole 250. The button pivot bar 230 is coupled to the midframe 130 via two alignment pins (not shown) that extend into, and are in frictional engagement with the first alignment hole 240 and the second alignment hole 250.

Still referring to FIG. 2, the rocker switch 160 is in operational engagement with two switches that are surface mounted on the circuit board 220. Similarly the applications buttons 170, 180, 190, and 200, are in operational engagement with switches that are mounted on circuit board 220.

Figure 3:
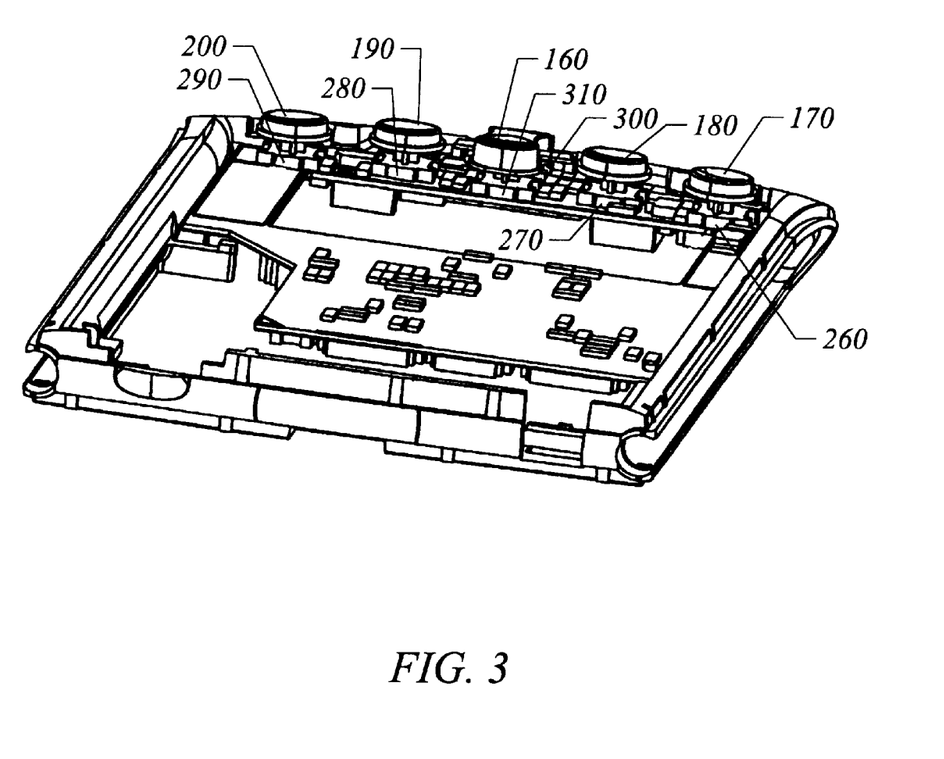
FIG. 3 illustrates a rearward top perspective view of a partially disassembled palm-sized computer, representing an embodiment of the invention.

Referring now to FIG. 3, the switches and their operational engagement can be more clearly seen. The first applications button, 170, is proximal a first switch 260. The second applications button, 180, is proximal a second switch 270. The third applications button, 190, is proximal a third switch 280. The fourth applications button, 200, is proximal a fourth switch 290. Similarly, the rocker switch 160 is proximal both a fifth switch 300 and a sixth switch 310.

Figure 4:
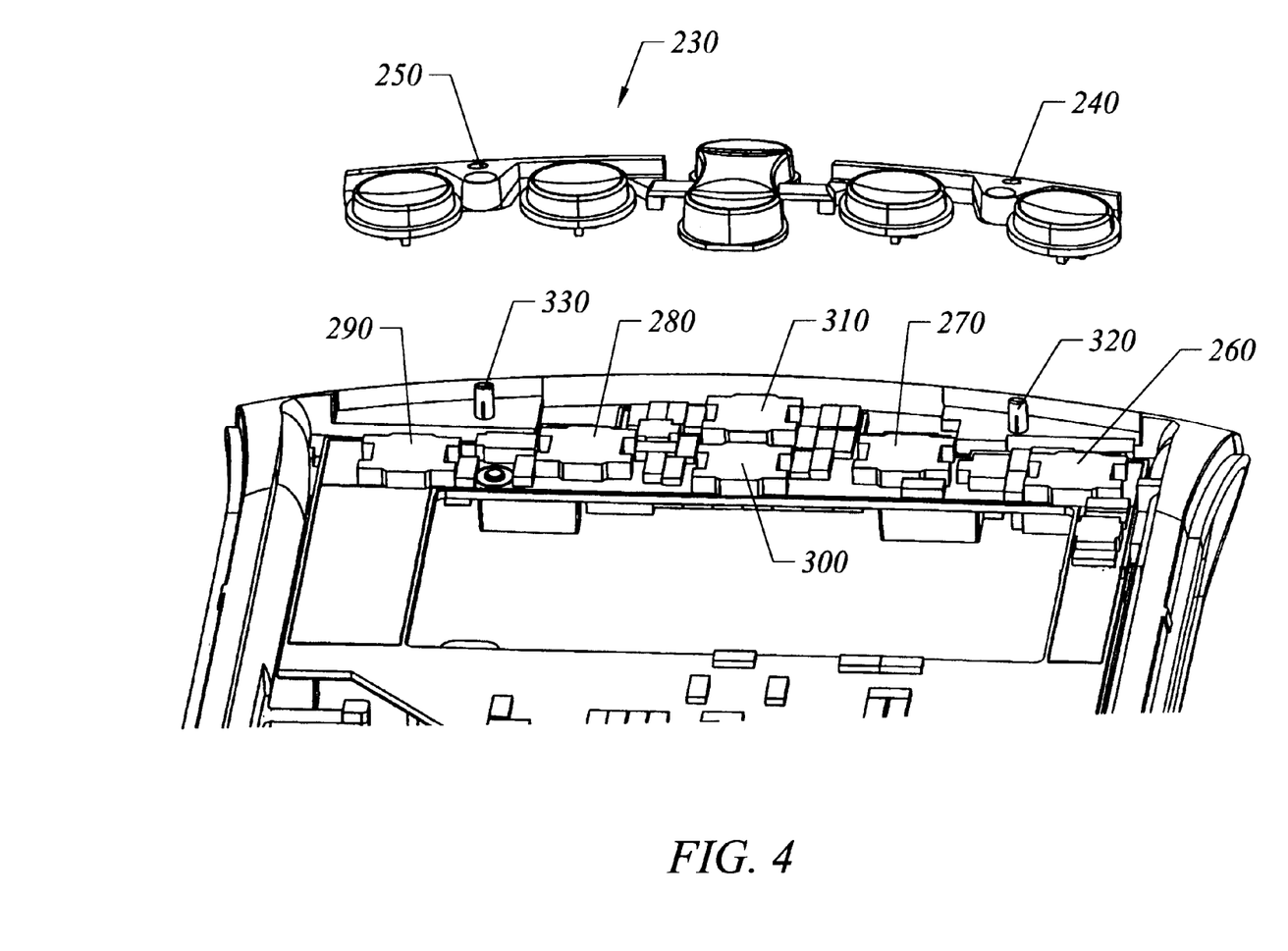
FIG. 4 illustrates a partially exploded rearward top perspective view of a partially disassembled palm-sized computer, representing an embodiment of the invention.

Referring now to FIG. 4, the unitary nature of the button pivot bar 230 can be appreciated. Although the button pivot bar 230 is depicted in a displaced position with regard to the balance of the apparatus, it can be appreciated that the first alignment hole, 240, 20 can be friction fit on the first alignment pin, 320. Similarly, the second alignment hole, 250, can be friction fit onto the second alignment pin, 330.

Still referring to FIG. 4, the first switch 260 and the fourth switch 290 are positioned along the same lateral line. Similarly, the second switch 270 and the third switch 280 are positioned on a single lateral line. The first switch 300 and the sixth switch 310 are positioned along the same longitudinal line. Since the fifth switch 300 and the sixth switch 310 are in operational engagement with rocker switch 160, a rotational axis of the rocker switch 160 is defined which is perpendicular to the longitudinal line along which the fifth switch 300 and the sixth switch 310 are located.

Figure 5:
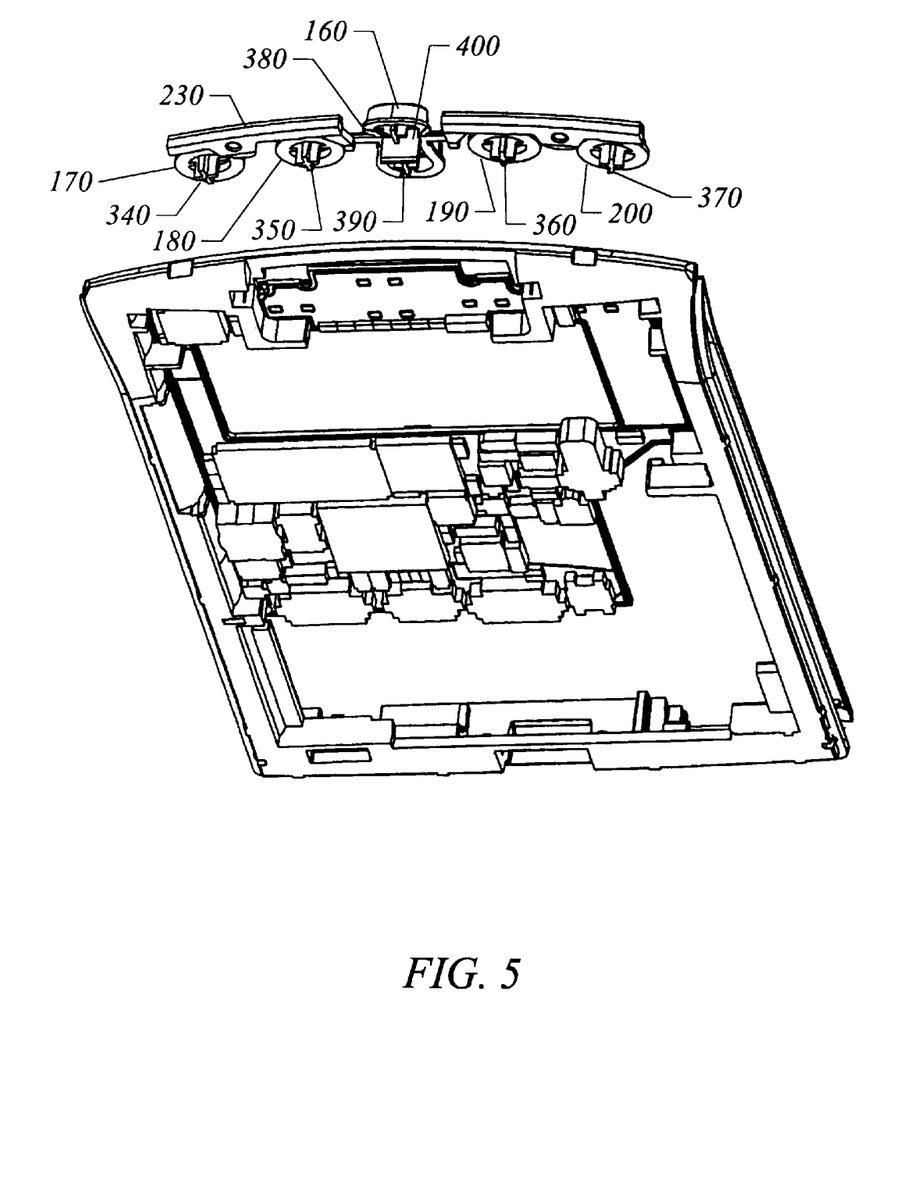
FIG. 5 illustrates a partially exploded forward bottom perspective view of a partially disassembled palm-sized computer, representing an embodiment of the invention.

Referring now to FIG. 5, the bottom side of the button pivot bar 230 can be better appreciated. The first applications button 170 includes a first extension 340. The second applications button 180 includes a second extension 350. The third applications button 190 includes a third extension 360. The fourth applications button 200 includes a fourth extension 370. The extensions 340, 350, 360, and 370, contact and press against the corresponding fluid-filled switches 260, 270, 280, and 290 when the corresponding buttons are actuated. The extensions 340, 350, 360, and 370 can define "plus" shaped cross sections. Such cross sectional shapes are particularly well adapted to actuate the fluid-filled switches 260, 270, 280, and 290.

Still referring to FIG. 5, the rocker switch 160 includes a lower extension 380 and an upper extension 390. The lower extension 380 and the upper extension 390 can also define "plus" shaped cross sections that are well adapted to actuate switches. The rocker switch 160 also includes a fulcrum 400. The fulcrum 400 acts as a pivoting surface. The fulcrum 400 can be in dynamic operational engagement with a portion of the surface of circuit board 220 that is located between fifth switch 300 and sixth switch 310. Thus, when the lower side of rocker switch 160 is depressed, the lower extension 380 will contact the sixth switch 310 (not shown in FIG. 5). Similarly, when the top side of rocker switch 160 is depressed, the upper extension 390 will contact the fifth switch 300.

Figure 6A:
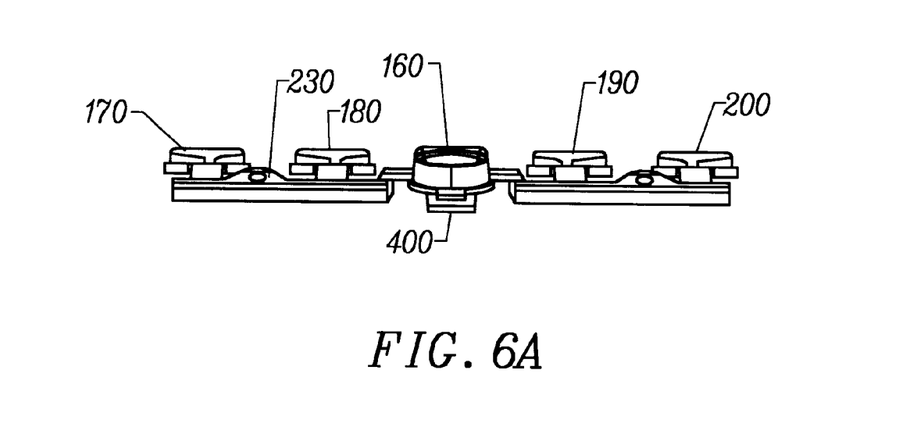
FIG. 6A illustrates an elevational view of a button pivot bar, representing an embodiment of the invention.
Figure 6B:
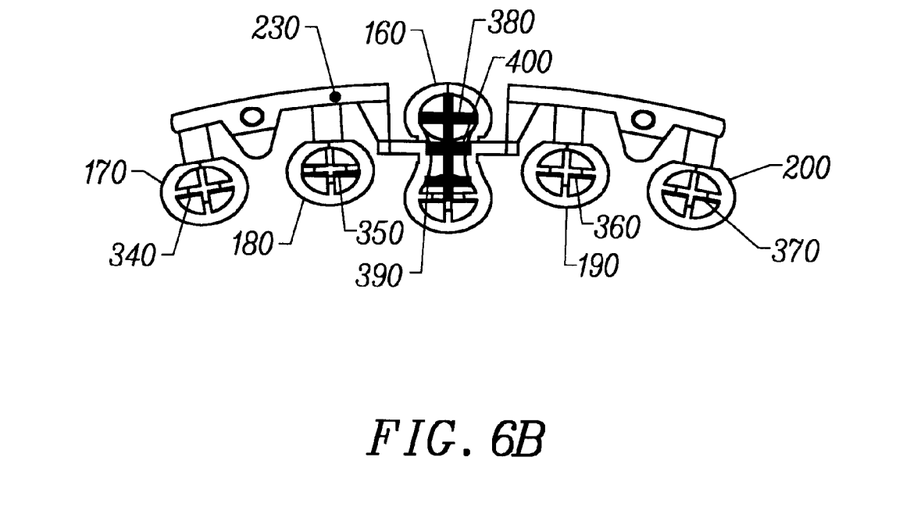
FIG. 6B illustrates a bottom view of the button pivot bar depicted in FIG. 6A, representing an embodiment of the invention.

Referring now to FIGS. 6A and 6B, some exemplary dimensions of the pivot bar 230 are given in millimeters. Of course, the example, and by extension the invention, are not limited to the specific dimensions depicted in FIGS. 6A and 6B. It can be appreciated that only the rocker switch 160 works with torsion, the other switches function as cantilevers. It can also be appreciated that the pivot bar 230 is substantially symmetric about a mirror plane defined by the rocker switch 160.

Figure 7A:
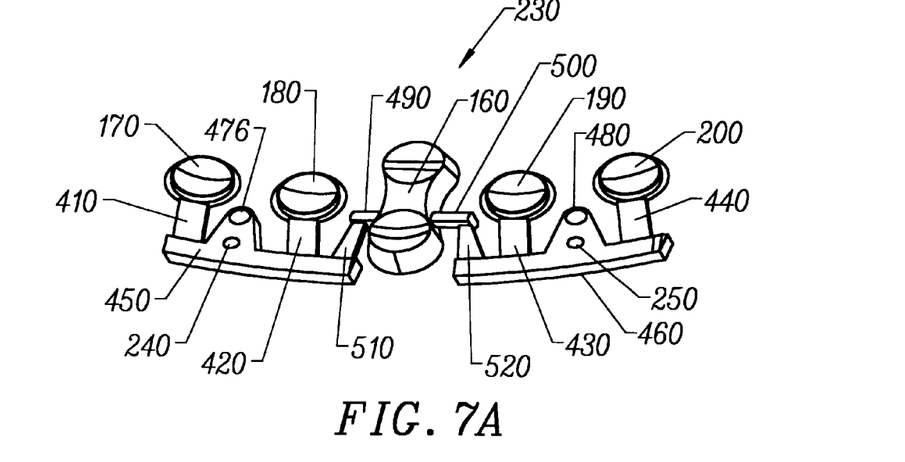
FIG. 7A illustrates a top perspective view of the button pivot bar depicted in FIGS. 6A and 6B, representing an embodiment of the invention.
Figure 7B:
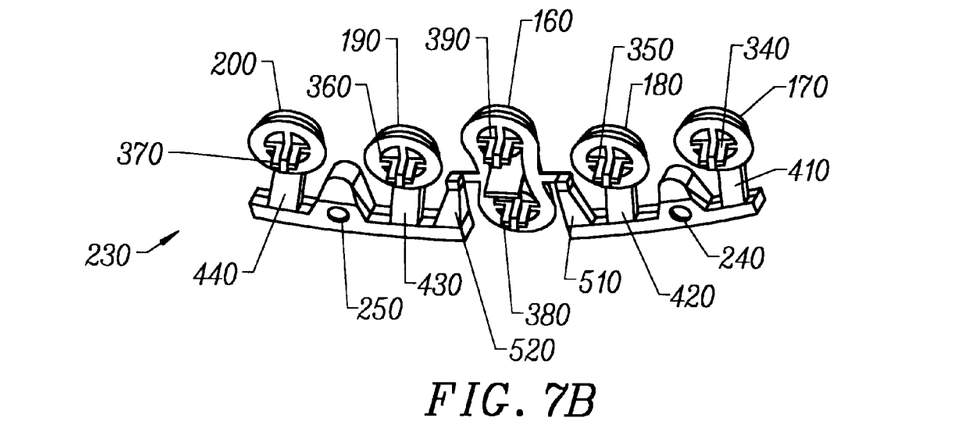
FIG. 7B illustrates a bottom perspective view of the button pivot bar depicted in FIGS. 6A–6B and 7A, representing an embodiment of the invention.

Referring now to FIGS. 7A and 7B, the button surfaces and the corresponding extensions can be better appreciated. The first applications button 170 is coupled to a first connecting member 410. The second applications button 180 is coupled to a second connecting member 420. The third applications button 190 is coupled to a third connecting member 430. The fourth applications button 200 is coupled to a fourth connecting member 440. The first connecting member 410 and the second connecting member 420 are coupled to a first connecting trunk 450. Similarly, the third connecting member 430 and the fourth connecting member 440 are coupled to a second connecting trunk 460. The first connecting trunk 450 includes a first supporting member 470. The first alignment hole 240 is located within the first supporting member 470. The second connecting trunk 460 includes a second connecting member 480. The second alignment hole 250 is located in the second supporting member 480.

Still referring to FIGS. 7A and 7B, the rocker switch 160 is coupled to a first torsion bar 490. The rocker switch 160 is also coupled to a second torsion bar 500. The first torsion bar 490 and the second torsion bar 500 can be substantially coaxial. The first torsion bar 490 is coupled to a fifth connecting member 510. The fifth connecting member 510 is coupled to the first connecting trunk 450. The second torsion bar 500 is coupled to a sixth connecting member 520. The sixth connecting member 520 is coupled to the second connecting trunk 460. Also, a first or second torsion bar 490, 500 can be coupled to said third connecting member.

Referring now to FIGS. 8A–8F, the cross sectional shape of the button pivot bar 230 can be better appreciated. The shape of the button pivot bar 230 functions to keep all of the buttons independently actuatable.

Figure 8A:
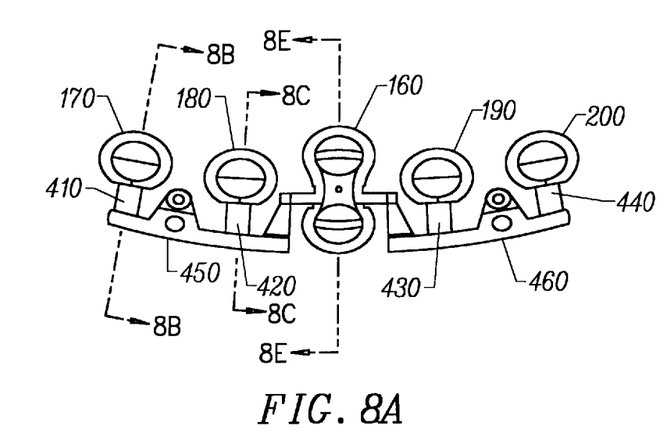
FIG. 8A illustrates a top view of the button pivot bar depicted in FIGS. 6A–6B and 7A–7B, representing an embodiment of the invention.

Referring now to FIG. 8A, some exemplary dimensions of the button pivot bar 230 are given in millimeters and degrees. Section lines A—A, B—B, and C—C define vertical planes extending into and out of the page. Arrows at the ends of section lines A—A, B—B, and C—C indicate, in reference to the cross-sectional views of FIGS. 8B, 8C, 8D, and 8E, the viewing direction from the vertical planes defined by section lines A—A, B—B, and C—C.

Figure 8B:
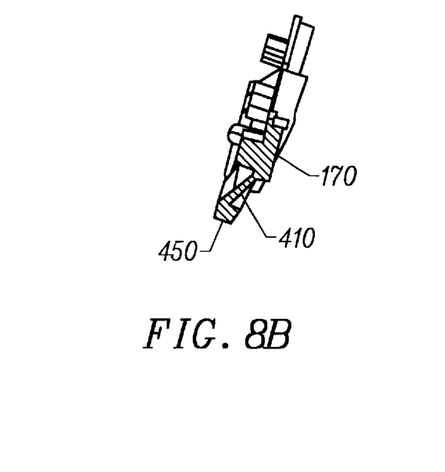
FIG. 8B illustrates a cross-section of the button pivot bar illustrated in FIG. 8A taken along section line C—C, representing an embodiment of the invention.

Referring now to FIG. 8B, the cross sectional shape of the pivot bar along section line C—C through the first applications button 170, the first connecting member 410, and the first connecting trunk 450 can be better appreciated. The hashed area of FIG. 8B indicates the vertical plane defined by section line C—C in FIG. 8A which cuts through the first applications button 170, the first connecting member 410, and the first connecting trunk 450.

Figure 8C:
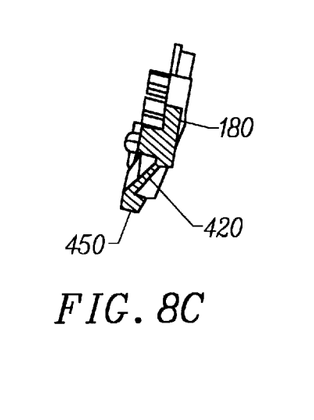
FIG. 8C illustrates a cross-sectional view of the button pivot bar depicted in FIG. 8A taken along section line B—B, representing an embodiment of the invention.

Referring now to FIG. 8C, the cross sectional shape of the pivot bar along section line B—B through the second applications button 180, the second connecting member 420, and the first connecting trunk 450 can be better appreciated. The hashed area of FIG. 8C indicates the vertical plane defined by section line B—B in FIG. 8A which cuts through the second applications button 180, the second connecting member 420, and the first connecting trunk 450.

Figure 8D:
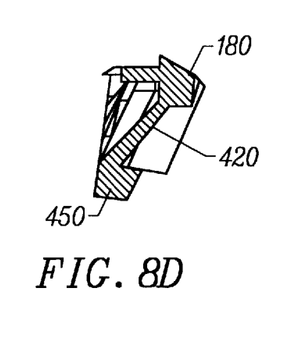
FIG. 8D illustrates an expanded view of a portion of the structure depicted in FIG. 8C, representing an embodiment of the invention.

Referring now to FIG. 8D, an expanded view of a portion of the cross sectional view of the pivot bar in FIG. 8C can be appreciated. Some exemplary dimensions of the second connecting member 420, the first connecting trunk 450, and a portion of the second applications button 180 are given in millimeters.

Figure 8E:
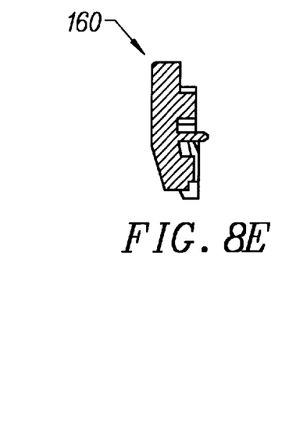
FIG. 8E illustrates a cross-sectional view of the button pivot bar depicted in FIG. 8A taken along section line A—A, representing an embodiment of the invention.

Referring now to FIG. 8E, the cross sectional shape of the pivot bar along section line A—A through the rocker switch 160 can be better appreciated. The hashed area of FIG. 8E indicates the vertical plane defined by section line A—A in FIG. 8A which cuts through the rocker switch 160.

Figure 8F:
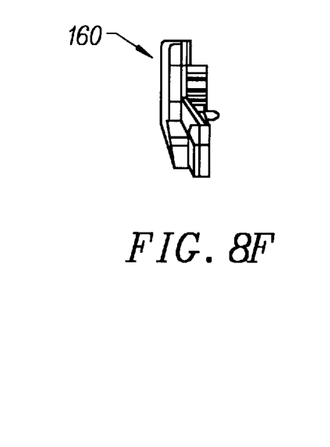
FIG. 8F illustrates an end view of the button pivot bar depicted in FIG. 8A, representing an embodiment of the invention.

Referring now to FIG. 8F, an end view of the area of the pivot bar section shown in FIG. 8E allows better appreciation of the rocker switch 160. Some exemplary dimensions of the rocker switch 160 are given in millimeters.

Practical Applications of the Invention

A practical application of the invention that has value within the technological arts is providing a touch screen equipped palm sized computer with stylus tappable buttons.

Further, the invention is useful in conjunction with configuring a plurality of palm sized computer applications buttons (such as are used for the purpose of launching, or switching between, programs), or in conjunction with configuring a plurality of palm sized computer navigation buttons (such as are used for the purpose of moving a display cursor), or the like. There are virtually innumerable uses for the invention, all of which need not be detailed here.

Advantages of the Invention

A palm sized computer with stylus tappable buttons, representing an embodiment of the invention, can be cost effective and advantageous for at least the following reasons. The invention permits a plurality of independently actuatable buttons to be provided on a palm sized computer with a single member that can be integrally formed. The invention permits an independently actuatable rocking switch to be operated without affecting the state of an independently actuatable button. The invention permits an independently actuatable rocking switch to be provided on a palm sized computer with a actuating motion that defines an elongated arc. These advantages make it less costly to make a palm sized computer incorporating the buttons of interest.

Moreover, the invention allows a user of a palm sized computer to actuate one, or more, stylus tappable buttons without diverting the user's attention from the tip of the stylus, or reconfiguring the user's hand. This advantage makes operation of the palm sized computer more convenient and less time consuming.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the button pivot bar described herein can be a physically separate module, it will be manifest that the button pivot bar may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. A palm sized computer, the palm sized computer including a display that is operable with a stylus, the palm sized computer comprising:

a connecting trunk;

a first connecting member coupled to said connecting trunk;

a first independently actuatable button coupled to said first connecting member;

a second connecting member coupled to said connecting trunk;

a second independently actable button coupled to said second connecting member;

a supporting member coupled to said connecting trunk and an aligning hole formed in said supporting member;

a third connecting member coupled to said connecting trunk;

a torsion bar coupled to said third connecting member; and an independently actuatable rocking switch coupled to said torsion bar, wherein said connecting trunk, said first connecting member, said first independently actuatable button, said second connecting member, and said second independently actuatable button are all integrally formed.

2. The palm sized computer of claim 1, further comprising:

another torsion bar coupled to said independently actuatable rocking switch, wherein said torsion bar and said another torsion bar are substantially coaxial.

3. The palm sized computer of claim 2, further comprising:

a fourth connecting member coupled to said another torsion bar.

4. The palm sized computer of claim 3, further comprising:

another connecting trunk coupled to said fourth connecting member.

5. The palm sized computer of claim 4, further comprising:

a fifth connecting member coupled to said another connecting trunk.

6. The palm sized computer of claim 5, further comprising:

a third independently actuatable button coupled to said fifth connecting member.

7. The palm sized computer of claim 4, further comprising:

another supporting member coupled to said another connecting trunk, an aligning hole formed in said another supporting member having another aligning hole formed therein.

8. The palm sized computer of claim 7, further comprising:

another aligning pin coupled to said another aligning hole, said another aligning pin being coupled to said frame.

9. The palm sized computer of claim 1, further comprising:

a first extension coupled to said independently actuatable rocking switch; and a second extension coupled to said independently actuatable rocking switch.

10. The palm sized computer of claim 9, wherein both said first extension and said second extension define + shaped cross sectional areas.

11. A palm sized computer that can be held in one hand and operated with a stylus held by another hand, comprising a button pivot bar including:

a connecting trunk;

a first connecting member coupled to said connecting trunk;

an independently actuatable button coupled to said first connecting member;

a second connecting member coupled to said connecting trunk;

a torsion bar connected to said second connecting member; and an independently actuatable rocking switch coupled to said second connecting member, wherein said connecting trunk, said first connecting member, said independently actuatable button, said second connecting member, said torsion bar, and said independently actuatable rocking switch are all integrally formed and actuating said independently actuatable rocking switch does not affect said independently actuatable button.

12. The palm sized computer of claim 11, further comprising:

a supporting member coupled to said connecting trunk, said supporting member having an aligning hole formed therein.

13. The palm sized computer of claim 12, further comprising:

an aligning pin coupled to said aligning hole and a frame coupled to said aligning pin.

14. The palm sized computer of claim 11, further comprising:

a third connecting member coupled to said connecting trunk.

15. The palm sized computer of claim 14, further comprising:

a second independently actuatable button coupled to said third connecting member.

16. The palm sized computer of claim 15, further comprising:

another torsion bar coupled to said independently actuatable rocking switch, wherein said torsion bar and said another torsion bar are substantially coaxial.

17. The palm sized computer of claim 16, further comprising:

a fourth connecting member coupled to said another torsion bar.

18. The palm sized computer of claim 17, further comprising:

another connecting trunk coupled to said fourth connecting member.

19. The palm sized computer of claim 18, further comprising:

a fifth connecting member coupled to said another connecting trunk.

20. The palm sized computer of claim 19, further comprising:

a third independently actuatable button coupled to said fifth connecting member.

21. The palm sized computer of claim 18, further comprising:

another supporting member coupled to said another connecting trunk, said another supporting member having another aligning hole formed therein.

22. The palm sized computer of claim 21, further comprising:

another aligning pin coupled to said another aligning hole, said another aligning pin being coupled to said frame.

23. The palm sized computer of claim 11, further comprising:

an extension coupled to said independently actuatable button.

24. The palm sized computer of claim 23, wherein said extension defines a + shaped cross sectional area.

25. The palm sized computer of claim 11, further comprising:

a first extension coupled to said independently actuatable rocking switch; and a second extension coupled to said independently actuatable rocking switch.

26. The palm sized computer of claim 25, wherein both said first extension and said second extension define + shaped cross sectional areas.

27. A palm sized computer that can be held in one hand and operated with a stylus held by another hand, comprising:

an independently actuatable rocking switch having an integrally formed fulcrum that defines a first plane located beneath a second plane defined by a center of gravity of said independently actuatable rocking switch.

28. A palm sized computer, the palm sized computer including a display that is operable with a stylus, the palm sized computer comprising:

an independent actuatable rocking switch having an integrally formed fulcrum that defines a first plane located beneath a second plane defied by a center of gravity of said independently actuatable rocking switch; and a torsion bar coupled to said independently actuatable rocking switch.

29. The palm sized computer of claim 28, further comprising:

a connecting member coupled to said torsion bar.

30. The palm sized computer of claim 29, further comprising:

a connecting trunk coupled to said connecting member.

31. The palm sized computer of claim 30, further comprising:

another connecting member coupled to said connecting trunk.

32. The palm sized computer of claim 31, further comprising:

an independently actuatable button coupled to said another connecting member.

33. The palm sized computer of claim 30, further comprising:

a supporting member coupled to said connecting trunk, said supporting member having an aligning hole formed therein.

34. The palm sized computer of claim 30, further comprising:

another torsion bar coupled to said independently actuatable rocking switch.

35. The palm sized computer of claim 34, further comprising:

another connecting member coupled to said another torsion bar.

36. The palm sized computer of claim 35, further comprising:

another connecting trunk coupled to said another connecting member.

37. The palm sized computer of claim 36, further comprising:

another supporting member coupled to said another connecting trunk, said supporting member having another aligning hole formed therein.

38. The palm sized computer of claim 37, further comprising:
   another aligning pin coupled to said another aligning hole, said another aligning pin being coupled to said frame.

39. The palm sized computer of claim 30, further comprising:
   an extension coupled to said independently actuatable button.

40. The palm sized computer of claim 39, wherein said extension defines a + shaped cross sectional area.

41. The palm sized computer of claim 27 further comprising:
   a first extension coupled to said independently actuatable rocking switch; and
   a second extension coupled to said independently actuatable rocking switch.

42. The palm sized computer of claim 41, wherein both said first extension and said second extension define + shaped cross sectional areas.

43. The palm sized computer of claim 1, further comprising:
   another torsion bar coupled to said independently actuatable rocking switch, wherein said torsion bar and said another torsion bar are substantially coaxial;
   a fourth connecting member coupled to said another torsion bar;
   another connecting trunk coupled to said fourth connecting member; and
   an aligning hole formed in said another connecting pin.

44. The palm sized computer of claim 43, further comprising:
   another aligning pin coupled to said another aligning hole, said another aligning pin being coupled to said frame.

45. A palm sized computer, the palm sized computer including a panel accessing a display that is operable with a stylus, the palm sized computer comprising:
   a connecting trunk with a pivotal axis, at lest a portion of the trunk having a radius of curvature with respect to the pivotal axis;
   a first connecting member coupled to said connecting trunk;
   a first independently actuatable button coupled to said first connecting member, the first button configured to be actuatable from the panel;
   a second connecting member coupled to said connecting trunk; and
   a second independently actuatable button coupled to said second connecting member, the second button configured to be actuatable from the panel.

46. A palm sized computer, the palm sized computer including a panel accessing a display that is operable with a stylus, the palm sized computer comprising;
   a connecting trunk;
   a first connecting member coupled to said connecting trunk;
   a second connecting member coupled to said connecting trunk;
   a torsion bar coupled to said first and said second connecting members; and
   an independent actuatable rocking switch coupled to said torsion member, the switch configured to be actuatable from the panel.

47. The palm sized computer of claim 46, wherein the switch is configured to control a display cursor appearing on the display.

48. The palm sized computer of claim 46, further comprising one or more independently actuatable buttons connected to the connecting trunk to affect processing of the palm sized computer.

49. The palm sized computer of claim 46, wherein the rocking switch is movable towards a top and a bottom of the palm-sized computer, wherein movement towards the top of the computer causes an image on the display to appear more towards the top of the computer, and wherein movement towards the bottom of the computer causes the image on the display to appear more towards the bottom of the computer.

* * * * *